United States Patent [19]

Kröbel et al.

[11] Patent Number: 4,465,364
[45] Date of Patent: Aug. 14, 1984

[54] ARRANGEMENT FOR PROJECTING AN IDENTIFYING IMAGE ON TO A FILM

[75] Inventors: Heinz Kröbel, Taufkirchen; Heinrich Färber; Jürgen Müller, both of Munich, all of Fed. Rep. of Germany

[73] Assignee: Agfa-Gevaert Aktiengesellschaft, Leverkusen, Fed. Rep. of Germany

[21] Appl. No.: 403,611

[22] PCT Filed: Aug. 14, 1981

[86] PCT No.: PCT/EP81/00124
§ 371 Date: Jul. 12, 1982
§ 102(e) Date: Jul. 12, 1982

[87] PCT Pub. No.: WO82/01775
PCT Pub. Date: May 27, 1982

[30] Foreign Application Priority Data

Nov. 14, 1980 [DE] Fed. Rep. of Germany ....... 3043067

[51] Int. Cl.³ ............................................ G03B 27/52
[52] U.S. Cl. .................................... 355/40; 354/109; 355/74
[58] Field of Search .................. 355/27, 72, 74, 64, 355/40; 354/109, 105, 106, 174, 180, 275, 278, 277, 107, 108

[56] References Cited

FOREIGN PATENT DOCUMENTS 2021494 5/1970 Fed. Rep. of Germany .
2710699 9/1978 Fed. Rep. of Germany .
2452125 10/1980 France .

Primary Examiner—Richard A. Wintercorn
Attorney, Agent, or Firm—Peter K. Kontler

[57] ABSTRACT

An arrangement is disclosed for projecting an identifying image from a data carrier on to a film in a cassette provided with a window which may be sealed against light. The arrangement has an opening mechanism for pushing a cover for the window open and closed. The arrangement further has a projection mechanism and switch means for triggering the opening mechanism and the exposure. The opening mechanism has an engaging device which is guided on a carriage and engages the window cover. The engaging device, which is held in engagement with the window cover via a spring, may be disengaged from the same in any position of the carriage by means of a lifting mechanism. The lifting mechanism has a crank which is connected with the engaging device and is operable from externally.

14 Claims, 3 Drawing Figures

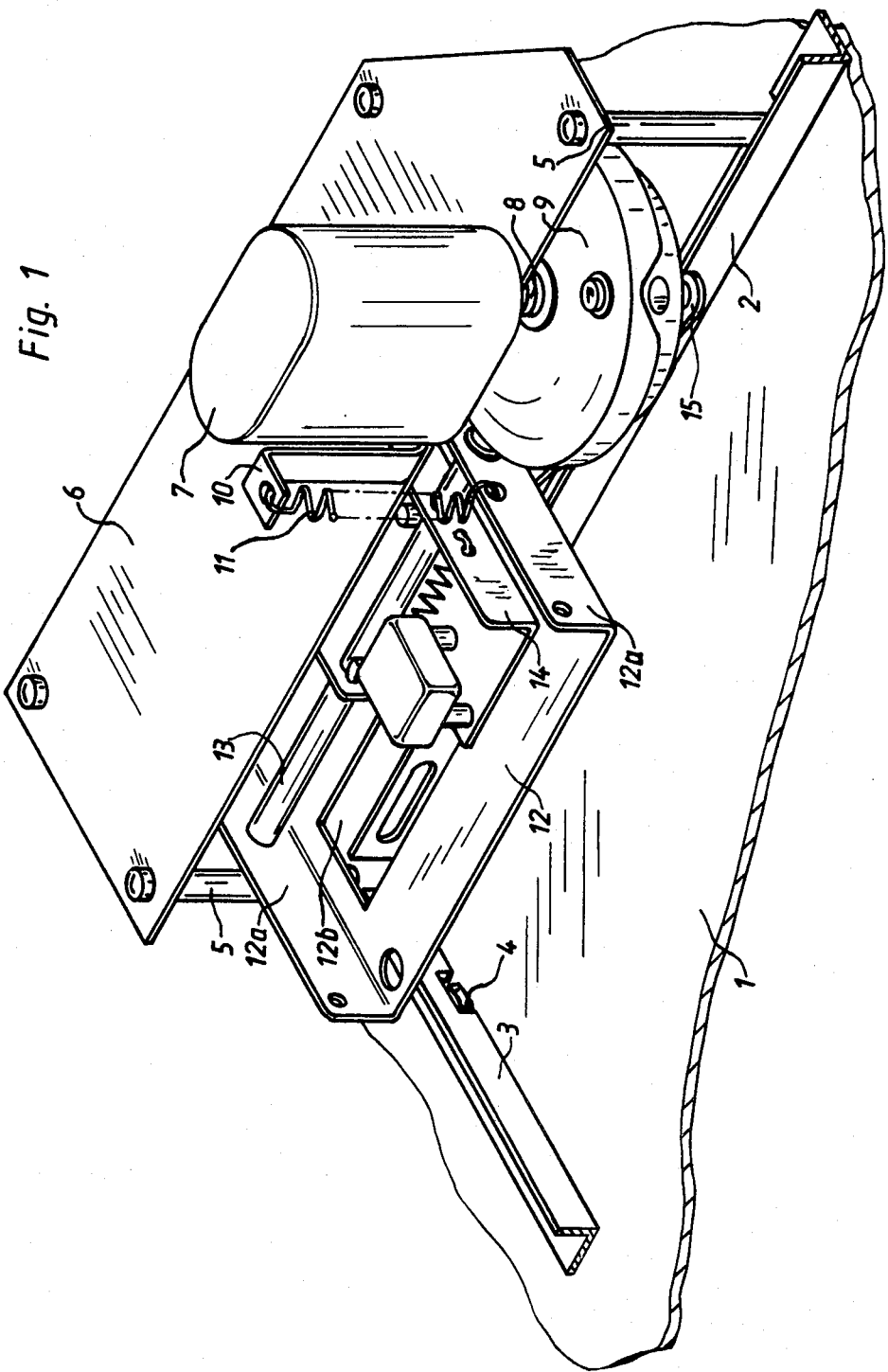

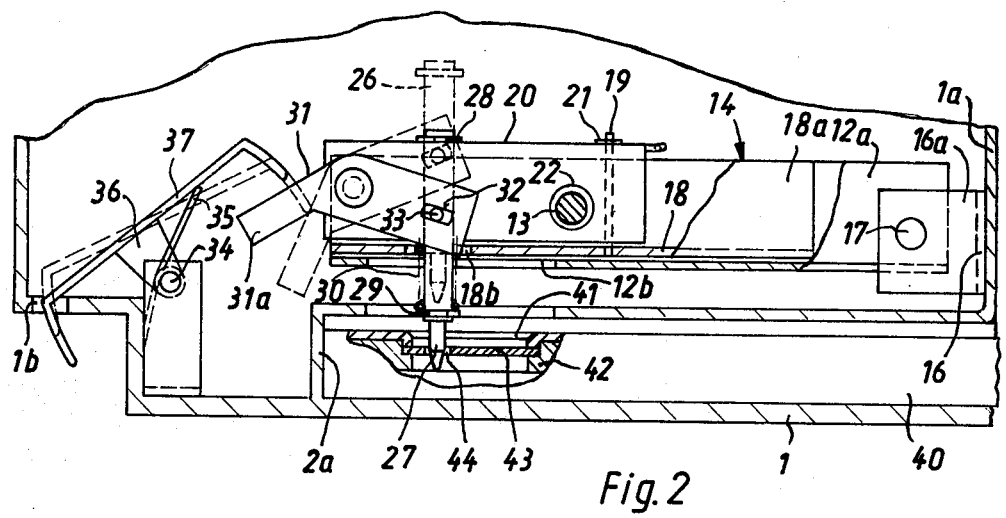
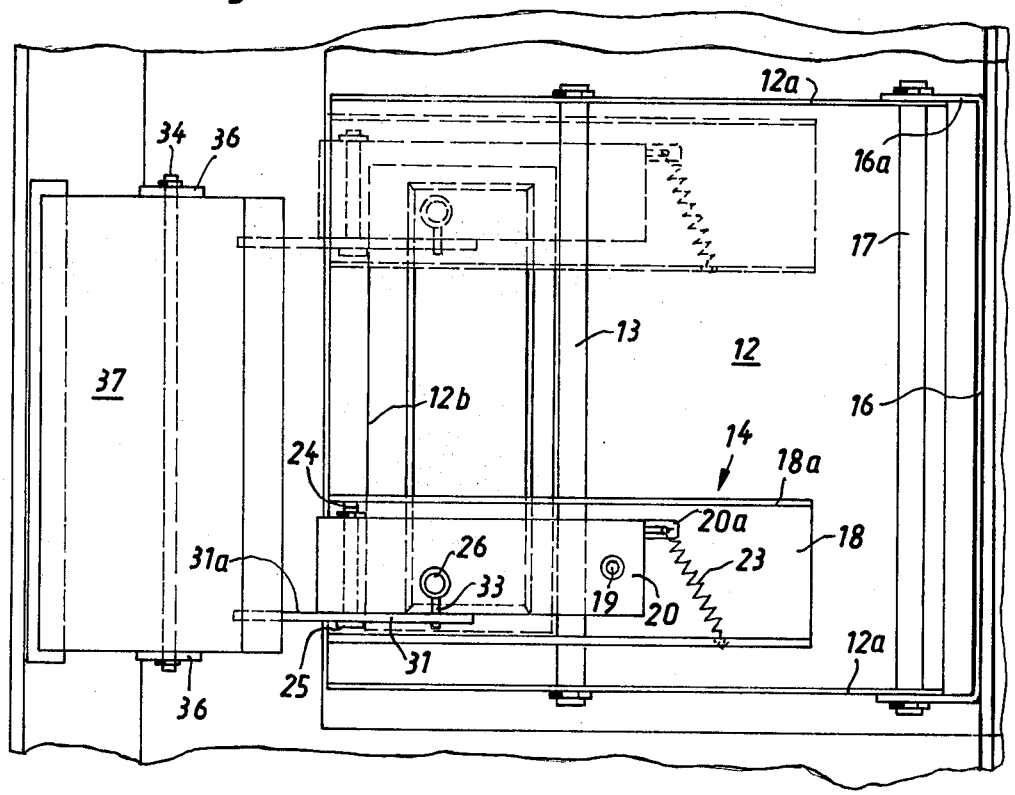

ARRANGEMENT FOR PROJECTING AN IDENTIFYING IMAGE ON TO A FILM

BACKGROUND OF THE INVENTION

The invention relates to an arrangement for projecting an identifying image from a data carrier on to a film in a cassette having a window which may be sealed against light by a cover. An opening mechanism is provided for releasing the cover and for pushing the same open and closed. The arrangement further has a projection mechanism and switch means for triggering the opening mechanism and the exposure. The opening mechanism has an engaging device which is guided on a carriage and engages the window cover.

An arrangement of the type described above is known from the DE-AS No. 20 21 494. The engaging device is arranged on a support which is pivotally connected with the carriage. The pivot axis of the support is perpendicular to the direction of movement of the carriage. A coil spring exerts a rotational moment on the support. The support is provided with a guide roller which travels along the cassette during movement of the carriage and pivots the support into the engagement position for the engaging device.

In the known arrangement, it has now been found that an engaging device which has been moved into the engagement position remains in this position during a malfunction of the arrangement or during a drop in current. Thus, the cassette can no longer be removed from the arrangement. This is extremely impractical since the cassette, which is inserted in the arrangement with one corner, must normally be held by the operator at one end. The operator is therefore unable to eliminate the malfunction.

OBJECTS AND SUMMARY OF THE INVENTION

Accordingly, it is an object of the invention to further develop an arrangement of the type described above so that removal of the cassette is also possible during malfunctions or a drop in voltage.

This object is achieved by the invention in that the engaging device is disengageable from the window cover by means of a lifting mechanism in each position of the carriage.

A purely mechanical uncoupling of the engaging device and the cassette is effected by the invention. As a result, the cassette can be removed from the arrangement during any malfunction so that the operator is free for other activities.

BRIEF DESCRIPTION OF THE DRAWINGS

Additional details and advantages of the invention will become apparent from the following description of an exemplary embodiment which is illustrated in detail by the accompanying figures.

FIG. 1 is a schematic perspective view of the overall structure of an opening mechanism according to the invention;

FIG. 2 is a cross section of an opening mechanism similar to that of FIG. 1 but with the support plate mounted at the front side of the arrangement; and FIG. 3 is a partially broken away plan view of the opening mechanism illustrated in FIG. 2.

DESCRIPTION OF THE PREFERRED EMBODIMENTS

A support table of the arrangement according to the invention is indicated by 1 in FIG. 1. A first guide bar 2 is arranged on the support table 1 as is a second guide bar 3 which makes a right angle with the guide bar 2. A switch element 4 is located in the guide bar 3 and is activated upon insertion of a film cassette. Similarly, a non-illustrated switch element is located in the guide bar 2 and can penetrate into a standard depression in a film cassette so that it is not actuated by a properly positioned cassette. The combination of these two switch elements serves to detect the presence of a cassette and to determine whether this is properly positioned.

Support columns 5 are provided outside of the range of insertion of the cassette and carry a mounting plate 6. A motor 7 is arranged on the upper side of the mounting plate 6. A crank and cam disk 9 is secured to the downwardly directed shaft 8 of the motor 7. A support arm 10 is further secured to the upper side of the mounting plate 6. A tension spring 11 for a pivotable support plate 12 is suspended from the support arm 10. In this example, the support plate 12 is supported at the rear side of the apparatus. The support plate 12 has two lateral portions 12a and a shaft 13 is mounted between the same. A carriage 14 is movably arranged on the shaft 13 and carries the engaging device or engaging mechanism as still to be described below. The carriage 14 is connected with a rocker linkage 15 which is rotatably mounted on the crank and cam disk 9. A cutout 12b is provided in the support plate 12 and the engaging device, which is not visible in FIG. 1, projects down through the cutout 12b into the recess of the cover for the cassette window.

Another manner of supporting the support plate 12 is described with reference to FIGS. 2 and 3 as is the mechanism according to the invention. Here, 16 identifies a U-shaped strip which is mounted at the front side of a housing 1a. A shaft 17 is journalled in the lateral portions 16a of the U-shaped strip 16. The lateral portions 12a of the support plate 12 are rotatably mounted on the shaft 17. The support plate 12 has an approximately square shape and the cutout 12b is arranged at a location opposite that where the support plate 12 is supported on the shaft 17. A relatively large pivoting radius is thus obtained. As a result, the engaging device is moved towards the cassette substantially perpendicularly during pivoting of the plate 12.

The carriage 14 has a U-shaped, upwardly open plate 18 with lateral portions 18a and a cutout 18b. A non-illustrated bore is provided in the carriage plate 18. A peg, which is also not illustrated and is mounted at one end of the rocker linkage 15, projects into the bore from below. The support plate 12 is provided with a corresponding groove. The peg of the rocker linkage 15 projects through the groove and is guided by the same during movement of the carriage 14. Each of the lateral portions 18a of the carriage 14 is formed with a bore which receives the shaft 13 on which the carriage 14 may be displaced.

A right-angled, four-sided tube 20 is arranged on the U-shaped plate 18 between the lateral portions 18a. The tube 20 is mounted for pivotal movement about a pin 19 which is fastened to the plate 18 and extends parallel to the lateral portions 18a. The four-sided tube 20 is secured to the pin 19 by means of a circlip 21. The pin 19 is located approximately at the center of the plate 18 and in the region of the shaft 13. A bore 22 which is larger than the shaft 13 is formed in the sides of the four-sided tube 20 and permits pivoting of the four-sided tube 20 between the lateral portions 18a. The four-sided tube 20 extends to those ends of the carriage 14 and the support plate 12 opposite the pivot shaft 17 and thus extends across the width of the cutout 12b in the support plate 12. The end of the four-sided tube 20 which faces the pivot shaft 17 has a lug 20a which receives a tension spring 23. The other end of the tension spring 23 is connected with one of the lateral portions 18a in such a manner that the four-sided tube 20 has a tendency to rotate in the clockwise direction. A pin 25 projecting through the four-sided tube 20 and extending parallel to the shaft 13 forms an abutment 24 which engages the other lateral portion 18a and limits pivotal movement of the four-sided tube 20. An engaging device 26 is vertically guided in the four-sided tube 20 and is approximately parallel to the pin 19. The engaging device 26 consists essentially of a round piece having a downwardly projecting engaging peg 27 secured thereto. Circlips 28 and 29 are mounted at the ends of the round piece. A compression spring 30 is arranged between the lower circlip 29 and the lower side of the four-sided tube 20. Thus, the engaging device 26 is held in the position indicated by full lines. In this position, the engaging device 26 projects sufficiently far out of the carriage 14 to engage a cover for a cassette window. Movement of the engaging device 26 is limited by the upper circlip 28 which lies against the upper side of the four-sided tube 20.

In accordance with the invention, a bell crank 31 is rotatably mounted on the four-sided tube 20 by the pin 25. One end of the bell crank 31 has an elongated slot 32 which receives a peg 33 mounted on the side of the engaging device 26. The other end 31a of the bell crank 31 projects beyond the region of the carriage 14 and terminates adjacent an actuating plate 37. The actuating plate 37 has a strap 36 at either side thereof and the straps 36 are mounted for rotation about a shaft 34 which extends parallel to the shaft 13. The length of the actuating plate 37 is at least equal to the displacement distance of the carriage 14. Both longitudinal sides of the plate 37 are bent. One longitudinal side projects to the exterior of the apparatus at the rear side of the same through a longitudinal slot 1b in the housing 1a. The edge of the other longitudinal side faces the end 31a of the bell crank 31. A torsion spring 35 is supported by the shaft 34 and one end of the same lies against a wall of the housing 1a. The other end of the torsion spring 35 lies against the inner side of the actuating plate 37 and holds the latter in such a manner that the longitudinal side which projects from the slot 1b lies against the edge of the slot 1b while the other longitudinal side nearly contacts the bell crank 31.

A portion of a cassette 40 lying on the table 1 is cut away so that a window 41, a guide plate 42, a movable window cover 43 and a bore 44 in the cover 43 may be observed. It will be further observed that, instead of the guide bar 2, a corresponding wall 2a is integrated in the housing 1a in FIG. 2.

In operation, a corner of the cassette 40 is inserted in the arrangement for the exposure of patient data or similar information. The cassette 40 rests between the support table 1 and the housing 1a and contacts the wall 2a which has a height corresponding to the thickness of the cassette 40. Upon activation of the motor 7 and the crank disk 9, the support plate 12 is first pivoted downwardly about the shaft 17 in a counterclockwise direction (FIG. 2) in a manner which is not particularly described so that the engaging peg 27 penetrates into the bore 44 of the cover 43. As the crank disk 9 rotates further, the carriage 14 is displaced to the position indicated in dashed lines (FIG. 3) which causes the window 41 to be opened. Exposure of the desired data occurs in this position. After the exposure, the movements are reversed and the carriage 14 is returned to its starting position. The support plate 12 is then pivoted upwardly so that the peg 27 releases the cover 43 of the cassette 40. In the event that this normal sequence is disturbed due to some influence, or if a voltage drop occurs, the operation of the motor 7 is terminated and the carriage 14 may, for example, stop halfway along its path of movement. The engaging peg 27 is in engagement with the cover 43 of the cassette 40. In such a case, the longitudinal side or marginal strip of the actuating plate 37 which projects through the slot 1b can be pressed upwardly by the operator so that it is rotated in a clockwise direction against the force of the spring 35. The other longitudinal side then presses against the end 31a of the bell crank 31 in any position of the carriage 14 so that the bell crank 31 is rotated in a counterclockwise direction. The peg 33 of the engaging device 26 is carried along during this rotation and the engaging device 26 is raised to the position indicated by dashed lines. In this position, the engaging peg 27 is drawn out of the cover 43 and out of the region of the cassette 40 so that the cassette 40 can be removed from the arrangement. As soon as this has occurred, the operator can release the actuating plate 37 so that all elements return to their starting positions and the engaging peg 27 is again lowered. In this position, it is not possible to insert another cassette, that is, the existing malfunction is also indicated to the next operator.

We claim:

1. An arrangement for forming an image on radiation-sensitive material, particularly for projecting data from a data carrier onto film, comprising:
   (a) projecting means for projecting an image towards radiation-sensitive material accommodated by a receptacle which is in a predetermined position and has an opening for exposure of the radiation-sensitive material to radiation and a removable cover for the opening;
   (b) engaging means movable between an engaged position in which said engaging means engages the cover of a receptacle in said predetermined position and a disengaged position, said engaging means being shiftable along a predetermined path while in said engaged position between a first position in which the cover of a receptacle in said predetermined position closes the opening of the receptacle and a second position in which the cover at least partially unblocks the opening; and
   (c) actuating means for said engaging means, said actuating means including an actuating mechanism which is operable from the exterior of said arrangement and is arranged to move said engaging means from said engaged position to said disengaged position at any location of said path.

2. An arrangement as defined in claim 1, wherein said actuating means further comprises an actuating device for automatically moving said engaging means between said engaged position and said disengaged position when said engaging means is in said first position.

3. An arrangement as defined in claim 1, comprising switch means for effecting exposure of radiation-sensitive material accommodated by a receptacle in said predetermined position.

4. An arrangement as defined in claim 1, comprising a carriage which is movable along said path; and wherein said engaging means is mounted on said carriage.

5. An arrangement as defined in claim 1, wherein said disengaged position is situated at a level above said engaged position.

6. An arrangement as defined in claim 1, comprising biasing means for biasing said engaging means towards said engaged position.

7. An arrangement as defined in claim 6, wherein said biasing means comprises a spring.

8. An arrangement as defined in claim 1, wherein said actuating mechanism comprises a lever which is connected with said engaging means.

9. An arrangement as defined in claim 8, comprising a housing for said engaging means and said lever, said housing having a slot which extends along said path; and wherein said actuating mechanism comprises an actuating member in said housing having a pair of longitudinal sides extending along said path, one of said sides projecting through said slot and the other of said sides being arranged to contact said lever upon operation of said actuating mechanism to thereby cause movement of said engaging means from said engaged position to said disengaged position.

10. An arrangement as defined in claim 9, wherein said actuating member comprises a plate.

11. An arrangement as defined in claim 8, said actuating mechanism comprising an actuating member which is arranged to contact one end of said lever upon operation of said actuating mechanism and thereby cause movement of said engaging means from said engaged position to said disengaged position; and wherein said lever has another end which is provided with a slit, said engaging means having a projection which is received in said slit.

12. An arrangement as defined in claim 11, wherein said projection extends laterally of said engaging means.

13. An arrangement as defined in claim 8, comprising a mounting member which supports said engaging means and said lever and is rotatable about a predetermined axis, and a pair of abutments for limiting rotation of said mounting member; and wherein said engaging means extends in a predetermined direction which is approximately prallel to said axis.

14. An arrangement as defined in claim 13, wherein said mounting member is four-sided.

* * * * *